United States Patent

Moriyama et al.

[11] 3,911,243
[45] Oct. 7, 1975

[54] WELDING POWER SOURCE

[75] Inventors: Norio Moriyama; Yasuzo Tsuchiya, both of Takarazuka, Japan

[73] Assignee: Matsushita Electric Industrial Co., Ltd., Osaka, Japan

[22] Filed: Apr. 24, 1974

[21] Appl. No.: 463,505

[30] Foreign Application Priority Data
Apr. 26, 1973  Japan............................ 48-47868

[52] U.S. Cl................ 219/135; 249/131 R; 321/10
[51] Int. Cl.²........................................... B23K 9/10
[58] Field of Search..... 219/131 F, 131 WR, 131 R, 219/137 PS, 135; 321/10; 323/45, 44 R

[56] References Cited
UNITED STATES PATENTS

| | | | |
|---|---|---|---|
| 1,852,125 | 4/1932 | Miessner | 321/10 X |
| 2,346,487 | 4/1944 | Hedding | 321/10 X |
| 3,211,953 | 10/1965 | Gibson et al. | 321/10 X |
| 3,308,265 | 3/1967 | Hobart | 219/131 R |
| 3,340,458 | 9/1967 | Keller | 321/10 |
| 3,733,536 | 5/1973 | Gillow et al. | 321/10 |

Primary Examiner—J. V. Truhe
Assistant Examiner—Clifford C. Shaw
Attorney, Agent, or Firm—Stevens, Davis, Miller & Mosher

[57] ABSTRACT

A welding power source comprising a rectifier connected on the output side of a welding transformer receiving a single phase AC input, a reactor having a closed magnetic flux path structure circuit and connected to the output side of the rectifier, said reactor having two windings which are wound so that the flux produced by one winding cancels the flux produced by the other winding; the junction between the two windings being connected to the rectifier, and a charging and discharging capacitor connected to one of the two windings, the output of the power source being taken from the other winding.

2 Claims, 6 Drawing Figures

WELDING POWER SOURCE

This invention relates to a welding power source for producing welding current from a single phase AC input. Its object is to provide a power source for automatic welding, for instance carbon dioxide gas arc welding, which permits welds to be made as simply and readily as when a power source which produce welding current from a three-phase AC input is employed.

In general, a DC power source for producing current from a single phase AC input is usually used in welding using a covered welding rod or TIG (tungsten inert gas), but in automatic welding such as carbon dioxide gas arc, a welding DC power source for producing welding current from a three-phase AC input has heretofore been used to provide an output waveform having minimum ripple.

In a welding DC power source for producing welding current from a single phase AC input, means for reducing the ripple of the output waveform is necessary. FIG. 1 shows an electric circuit for a prior art power source. her, numeral 1 designates a transformer capable of providing a variable output voltage or current, numerals 2, 3 and 4 respectively the primary winding, core and secondary winding of a welding transformer T, numeral 5 a rectifier, numeral 6 a smoothing capacitor, and numeral 7 a smoothing reactor. Sometimes, a single transformer may serve both as the transformer 1 and welding transformer T in FIG. 1. The smoothing capacitor 6 in FIG. 1 usually has a capacitance of the order of ten thousand to one hundred thousand microfarads. In the drawing:

Figure 1:
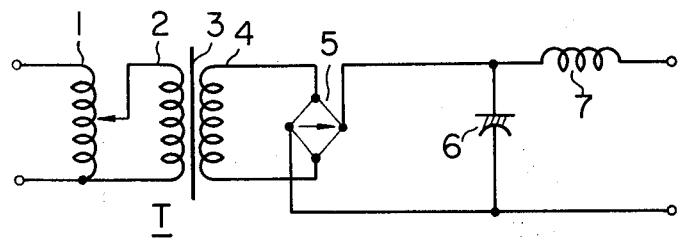
FIG. 1 is a circuit diagram of a prior art power source for welding.
Figure 2:
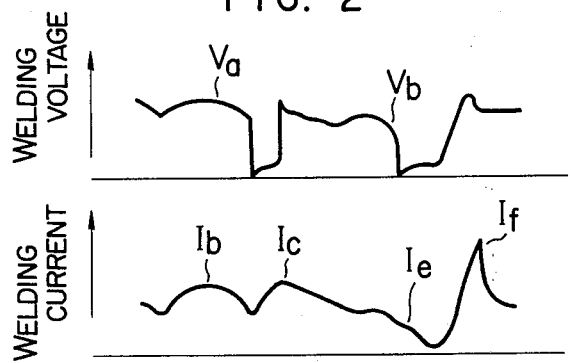
FIG. 2 show waveforms of welding voltage and welding current provided by the power source shown in FIG. 1.

The welding voltage and welding current provided when the power source of FIG.1 is used in carbon dioxide gas arc welding in the so-called short-circuit transition region below about 250 amperes are shown in FIG. 2. If the capacitance of the smoothing capacitor 6 and the inductance of the smoothing reactor 7 in the circuit of FIG. 1 are small, large ripples result in the welding voltage and current waveforms shown in FIG. 2. In this case, for a hill portion of the welding voltage as indicated at $V_a$ the welding current is also large as indicated at $I_b$, so that the product, i.e., power, is large, tending to result in overheating of the weldment and generation of much spattering. Also, when short circuiting of the wire to the base matal happens to occur for a valley portion of the welding voltage as indicated at $V_b$, insufficient welding current is obtained as indicated at $I_e$. Consequently, excessive short-circuit current as indicated at $I_f$ flows over the crest of the next ripple, thus resulting in the generation of much spattering. If the capacitance of the smoothing capacitor 6 and inductance of the smoothing reactor 7 are greater, flatter output waveforms are obtained. In this case, however, the rate of rise and peak of the short-circuit current at the time of short-circuit of the wire to the base metal are lower, as indicated at $I_c$, due to the reactor 7. Therefore, at this time smooth application of molten solder to base metal cannot be obtained. This inconvenience is particularly significant in butt welding.

To overcome this deficiency, it has been the practice to spray molten solder over the base metal by using a mixture of carbon dioxide gas and argon gas. However, the argon gas is expensive. Also, it is inconvenient in that it is necessary to control the mixing ratio. It has also been proposed to vary the capacitance of the smoothing capacitor and inductance of the smoothing reactor according to the welding current so as to obtain resonance with respect to the cycle of application of the molten solder. To obtain the aforesaid resonance, however, is difficult and impractical.

The invention is intended to overcome the above drawbacks inherent in the prior art, and an embodiment of the invention will now be described in connection with FIG. 3, in which parts corresponding to those in FIG. 1 are designated by like reference characters.

Figure 3:
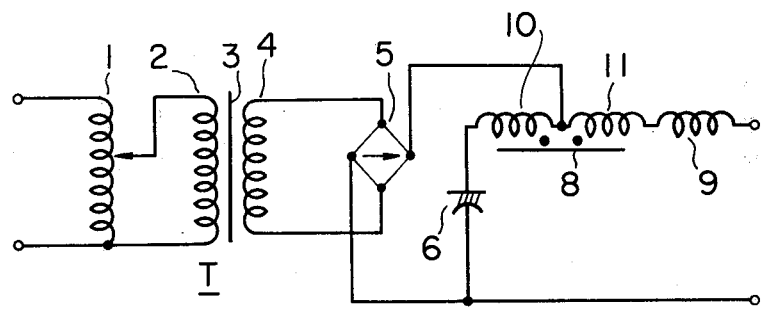
FIG. 3 is a circuit diagram of an embodiment of the power source for welding according to the invention.
Figure 4:
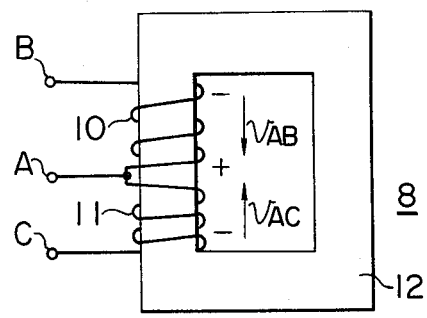
FIGS. 4 and 5 are schematic views of reactors used in the power source according to the invention.
Figure 5:
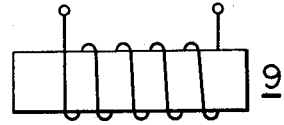

In FIG. 3, reference numeral 8 designates a reactor having a closed magnetic flux path structure, and numeral 9 a reactor having a open magnetic flux path structure. FIG. 4 shows the reactor 8 having the closed magnetic flux path structure. Its terminal A shown in FIG. 4 is connected to one DC side terminal of the reactifier 5, and its terminal B is connected through the capacitor 6 to the other DC side terminal of the rectifier 5. Its further terminal C is connected to the reactor 9 which is shown in detail in FIG. 5.

According to the invention, the reactor 8 shown in FIG. 4 is important. Its two windings 10 and 11 are wound in opposite directions. When current flows through reactor 8 from terminal A to terminal B, a voltage $V_{AB}$ appears in this reactor. With this current the flux through the core 12 changes to induce a voltage $V_{AC}$ between the terminals A and C. If the windings 10 and 11 have the same number of turns, $$|V_{AB}| = |V_{AC}|.$$

Figure 6:
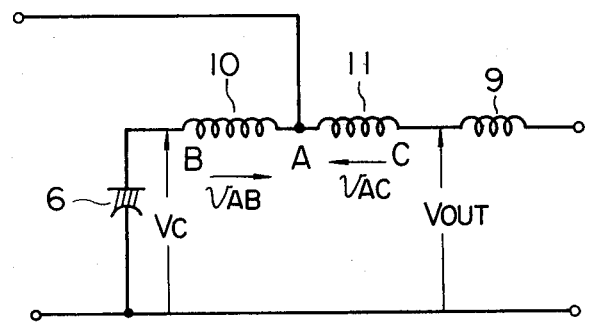
FIG. 6 is a circuit diagram showing the important part of the power source shown in FIG. 3.

Since $V_{AB}$ and $V_{AC}$ are of opposite polarities, the potential difference between the terminals B and C is zero. Thus, in the circuit of FIG. 6, $$V_{AB} + V_C = V_{AB} + V_{out}, \text{ and hence } V_C = V_{out}.$$

This means that although the charging and discharging of the capacitor 6 varies depending upon the input source voltage coupled through the rectifier 5 and the terminal voltage $V_C$ across the capacitor, in any case, $$V_C = V_{out}.$$

Since the capacitor 6 is charged and discharged through the reactor of FIG. 4, with variation of the input voltage, variation of the capacitor voltage $V_C$, and hence variation of output voltage $V_{out}$, is small.

Actually, the magnetic coupling between the windings 10 and 11 is not perfect, and the windings 10 and 11 serve as a reactor to suppress the ripple current. Thus, the ripple of the output voltage $V_{out}$ is reduced compared to the ripple of the capacitor voltage $V_C$.

In the carbon dioxide gas arc welding, current has to be increased at the time the is short-circuited. According to the invention, if the short-circuit of the wire takes place while the capacitor is being charged, voltage $V_{AB}$ is suddenly added to the reactor winding 10 in FIG. 4 due to a reduction of $V_{out}$, while at the same time voltage $V_{AC}$ is induced in the coil 11. Thus, the charging of the capacitor 6 is repressed to increase the load current. If the wire is short-circuited during the discharging of the capacitor, although voltages $V_{AB}$ and $V_{AC}$ similarly appear, they cancel since they are opposite in polarity. Thus, at this time the capacitor will be quickly discharged without being obstructed. It will thus be appreciated that whenever the short-circuit of the wire takes place, a sudden increase of the short-circuit current can be ensured. The magnitude of the afore-mentioned ripple and the rise characteristic of the current at the time of short-Circuit of the wire are related to the degree of coupling between the windings 10 and 11. If the degree of coupling is low, the rise of current at the time of short-circuit of the wire is slow though the ripple is small. Thus, it is important to provide adequate coupling between the two windings.

It is another feature of the circuit according to the invention that since the capacitor voltage is reduced at the time of short-circuit of the wire, the capacitor tends to be charged more quickly at the time of re-appearance of the arc upon ending of the wire short-circuit. To provide increased charging current the load current is reduced. Thus, sudden expansion of the gas surrounding the arc at reappearance due to arc heat can be repressed to reduce generation of spattering. According to the invention a performance well comparable with that of a three-phase full-wave rectification DC power source can be obtained with a smoothing capacitor with a capacitance of 50,000 micro-farads.

As has been described in the foregoing, according to the invention it is possible to provide a power source which readily enables automatic welding such as carbon dioxide gas arc welding with a single phase AC input. That is the power source has a low installation cost, and can be readily handled without the necessity of adjusting the inductance and capacitance according to the mixture ratio of the arc-surrounding gas or welding current as in the prior art arc welding.

In addition, it has been confirmed that when the invention is applied to a three-phase rectification DC power source where the output voltage is adjustable by controlling the conduction angle of a thyristor, smooth and effective welding as in the single phase rectification case can be obtained although the output voltage contains greater ripples.

What we claim is:

1. A power supply for providing power to an arc welding load comprising:
   a welding transformer having primary and secondary wingings,
   a rectifier having input and output terminals, said input terminals being connected to said secondary winding,
   a first reactor including first and second series-connected windings wound on a core having a closed magnetic path structure, said first and second windings being wound so that the magnetic flux produced by said first winding cancels the magnetic flux produced by said second winding, said first reactor having a relatively large coupling factor due to said closed magnetic path, the inductance of each of said first and second windings being relatively large and the net inductance of said first and second winings being relatively small,
   means coupling the junction of said first and second windings to an output terminal of said rectifier,
   a capacitor connected between the first winding of said first reactor and the other output terminal of said rectifier, and
   a second reactor having an open magnetic path structure and first and second terminals, the first terminal of said second reactor being coupled to the second winding of said first reactor, an arc being generated between the second terminal of said capacitor and the other output terminal of said rectifier, said power supply providing a relatively smooth output and rapid response to current changes with changes in said load.

2. A welding power source according to claim 1, wherein the primary winding of said welding transformer is connected to a single phase AC power source.

* * * * *